Jan. 23, 1962 M. SOJA 3,018,330
COMBINATION TELEVISION RECEIVER AND AUDIO SYSTEM
Filed July 31, 1959
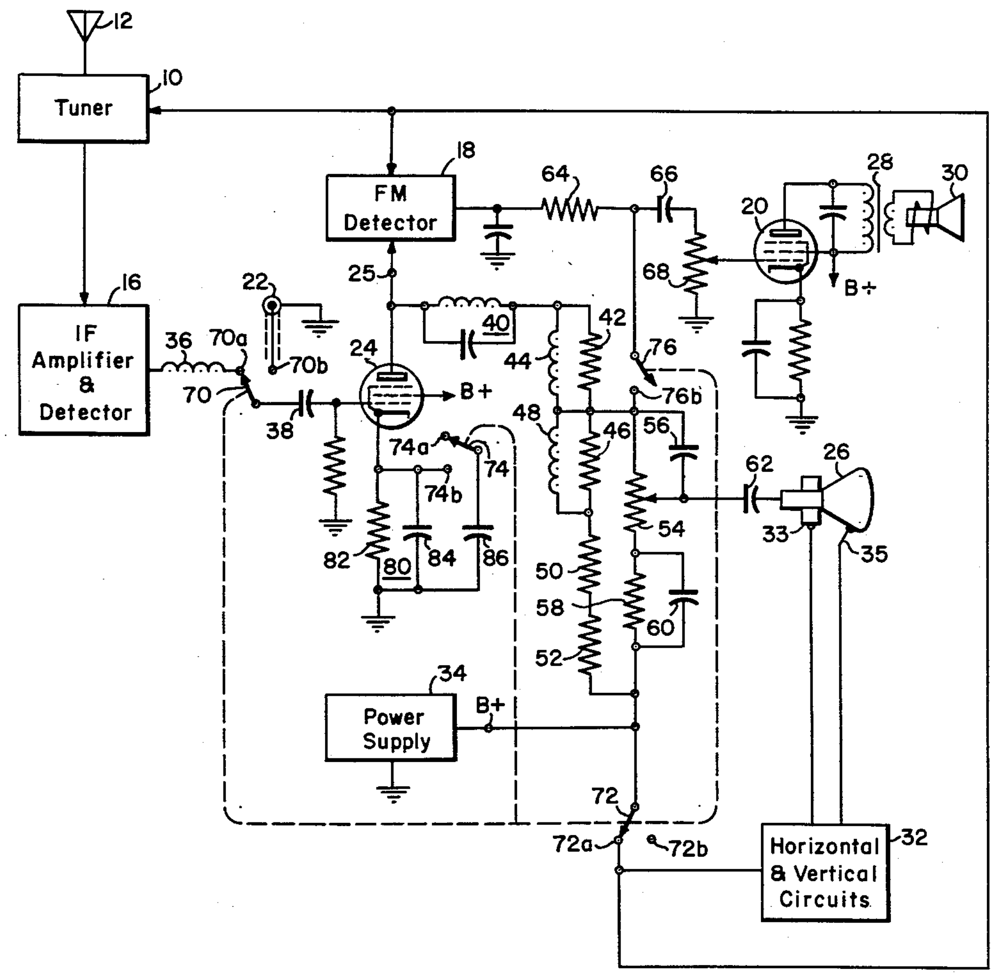
WITNESSES
Edwin L. Barber
James F. Young
INVENTOR
Matthew Soja
BY Benjamin DeWitt
ATTORNEY United States Patent Office 3,018,330

Patented Jan. 23, 1962

3,018,330

COMBINATION TELEVISION RECEIVER AND AUDIO SYSTEM

Matthew Soja, South Plainfield, N.J., assignor to Westinghouse Electric Corporation, East Pittsburgh, Pa., a corporation of Pennsylvania Filed July 31, 1959, Ser. No. 830,836
6 Claims. (Cl. 178—5.8)

The present invention relates generally to audio-video signal reproducing systems and more particularly to a combined television receiver and audio frequency signal reproducing apparatus.

In the prior art, television receivers and phonograph record players have been combined in a single cabinet. In such units it has been conventional practice to provide separate chassis for the television receiver and for the phonograph amplifiers. In other words, only the loudspeaker, and in some instances the last stage of audio amplification, are used for both television and phonograph sound reproduction. This results in a considerable duplication of elements as separate amplifying stages are provided in the phonograph system and the television receiver system. For this reason such combination phonograph-television units are undesirably large and expensive.

Although combined television and phonograph circuits have been constructed, these circuits have been relatively complicated and not entirely satisfactory in that the techniques required for reception of television signals and reproduction of recorded sound signals are quite different due to the different frequencies involved and the different characteristics of the signals received from the different signal sources.

Accordingly, it is an object of the present invention to provide an arrangement for utilizing a single wideband amplifier for selectively amplifying either the composite television signal or alternatively an audio frequency sound intelligence signal.

It is a further object of this invention to provide a simple and economical combination type television receiving circuit which not only provides reception and reproduction of composite television signals but also provides alternative utilization of the same circuitry for faithful amplification and reproduction of audio frequency sound intelligence signals such as may be derived from microphones or the signal pickup devices of phonographs and tape records and the like.

It is another object of the present invention to provide an economical circuit system for conventional television receivers which will enable use of the receiver for amplification and reproduction of audio frequency sound signals derived from the pickup device of conventional phonographs.

It is an additional object of this invention to provide a circuit arrangement whereby audio frequency sound signals from a phonograph pickup may be directly applied and reproduced by a television receiver circuit without the usual external preamplification of the audio signals.

A still further object of this invention is to provide a low cost television-phonograph combination including circuit arrangements whereby the circuitry normally used for amplification of the demodulated television signals may be selectively used for preamplification of audio signals from the phonograph pickup device thereby eliminating the preamplifier circuits normally required for good phonograph sound reproduction.

In order to accomplish the above objects the present invention contemplates the use of the existing video amplification circuits in a television receiver for preamplification of low level audio signals derived from a phonograph or tape recorder pickup. Through the use of novel circuit arrangements the input circuit of the wide band video amplifier is selectively coupled to either the television receiver second detector or to an external source of low level audio frequency signals. By means of commonly operable switches the output circuit of the video amplifier is selectively coupled to either the picture reproducing means or to the audio amplifier and cascade coupled loudspeaker. Simultaneously a degenerative feedback means associated with the video amplifier is selectively enabled and disabled to provide maximum bandwidth for transmission of video signals and, alternatively, to provide maximum gain for amplification of audio signals.

The foregoing and other objects and advantages of this invention will be apparent from the following description when taken in connection with the accompanying drawing in which the single FIGURE illustrates schematically one embodiment of the present invention as applied to a television receiver.

In practicing the invention there is provided a television receiver having a conventional radio frequency tuner portion, an intermediate frequency amplifier for intermediate frequency sound and video carrier signals, means for detecting the composite video signal, and a video signal amplifier stage having its input normally coupled to the output circuit of the video detector and having its output circuit normally coupled to the input electrodes of a picture reproducing means.

In accordance with present television standards, the composite video signal as received by the television receiver is amplitude modulated with video information corresponding to the optical information to be displayed. A second radio frequency carrier which is located 4.5 megacycles above the picture carrier is frequency modulated with audio intelligence to accompany and complement the reproduced picture. In accordance with conventional practice the picture carrier and sound carrier are passed through a common tuner, a common mixer, a common intermediate frequency amplifier and detector of suitable design, with the detector producing a composite demodulated video signal and also an intercarrier beat frequency carrier signal which is frequency modulated with sound information as described in prior art Patent No. 2,448,908. The composite signal output from the video detector occupies a band width of approximately 4.5 megacycles. The frequency range from zero to approximately 4.25 megacycles is occupied by the video intelligence in demodulated form, and the frequency band from 4.25 megacycles to approximately 4.5 megacycles is devoted to the frequency modulated sound intercarrier signal. Since the demodulated video signal and the sound intercarrier signal portions of the video program lie in different frequency bands, they may be separated by conventional means with the video signals being applied to the input electrodes of a cathode ray tube or other suitable picture display device and with the intercarrier sound signal being applied through a frequency modulation detector to an audio amplification system.

In order to convert the conventional television system as thus far described for reproduction of audio frequency sound signals, the input to the wide band video signal amplifier is disconnected from the video signal detector and is selectively coupled to a sound signal source such as for example, the crystal pickup of a record player. The wide band amplifier is modified to function as a substantially distortionless pre-amplifier of the sound signals, and its output circuit is selectively coupled to the input of the television receiver audio output amplifier, with the frequency modulation detector being effectively bypassed and preferably disabled. Simultaneously the picture display device and its various auxiliary circuits are preferably disabled so that the phonograph sound signal will not be spuriously displayed on the picture reproducing device and so that auxiliary signals associated with operation of the picture display device will not be spuriously conveyed by the sound reproducing system.

Referring now more specifically to the drawing there is presented by the block 10 some of the components of a typical present day television receiver including an RF amplifier and a heterodyne converter. In accordance with conventional practice, television signals intercepted by the antenna 12 are heterodyned by the tuner 10 to produce a composite video IF signal which is applied to the video IF amplifier and detector indicated by block 16. The video second detector of block 16 produces at its output a composite demodulated video signal which includes video intelligence in the frequency band extending from zero to approximately 4.25 megacyclse and further includes a 4.5 megacycle intercarrier signal which results from heterodyning of the video IF carrier and the sound IF carrier in the second detector. The 4.5 megacycle intercarrier signal is frequency modulated with picture complementing sound intelligence. The composite video signal including the video intelligence and the sound intercarrier signal is applied serially through an inductor 36, switch 70 and coupling capacitor 38 to the control grid of a wide band amplifier tube 24, which preferably is a conventional pentode amplifier tube provided with auxiliary circuit connections and elements such as to provide a substantially flat frequency response characteristic from zero to 4.5 megacycles. The 4.5 megacycle sound intercarrier is applied from the output of wide band amplifier 24, over conductor 25, to the input of a conventional FM detector indicated at block 18. The output of detector 18 is conventionally coupled through an audio frequency output amplifier 20 and audio transformer 28 to a sound reproducer or loudspeaker 30.

The video intelligence component is coupled from the anode of amplifier 24 through a tuned circuit 40 and inductor 44 to the upper end of a contrast control potentiometer 54 which is connected serially with resistor 58 to the positive terminal B+ of a conventional D.C. voltage supply source 34. The slider of contrast control 54 is connected through coupling capacitor 62 to the input electrode or grid of cathode ray tube 26.

Operating potential for the anode of amplifier 24 is provided by a series circuit including resistors 50 and 52 connected in series with inductors 44 and 48 to the positive terminal B+ of source 34. Resistors 50 and 52 and inductor 48 constitute the video load impedance of the wide band amplifier 24. Tuned circuit 40 in accord with conventional practice, is tuned to approximately the means frequency of the sound intercarrier signal and serves to apply the intercarrier signal to detector 18 for demodulation, while prohibiting transmission of the intercarrier signal to display device 26.

Inductor 44 shunted by resistor 42 operates in conjunction with inductor 48 shunted by resistor 46 to accentuate the gain of the high frequency portion of the video intelligence signal thereby providing a substantially flat frequency response characteristic across the frequency band occupied by the various frequency portions of the video intelligence. Resistor 58 shunted by capacitor 60 and connected serially with potentiometer 54 constitutes a video signal voltage divider whereby the amplitude of video signals applied to picture reproducer 26 may be manually controlled. Cathode ray tube 26 is provided with a conventional deflection yoke 33 to which is applied appropriate horizontal and vertical deflections scanning signals from conventional scan signal generator circuits indicated generally by the block 32. In accordance with conventional practice high volatge for energization of the cathode ray tube is generated by the horizontal deflection system and is applied to the cathode ray tube by way of conductor 35. The television receiver system as thus far described is generally similar to receiver circuit configurations which are well known in the art and in common use. Accordingly further detailed description of the system components for translating the television signal is believed to be unnecessary.

According to the embodiment of the present invention shown in the drawing a switch 70, not found in conventional television circuits, is provided between the output of the video second detector 16 and the input of the wide band amplifier 24. Specifically switch 70 has a common terminal which is connected through coupling capacitor 38 to the control grid of amplifier tube 24, and has first and second terminals **70*a* and 70*b* with terminal 70*a* being connected through isolating inductor 36 to the detector 16, and with terminal 70*b* being connected to a source of audio frequency sound intelligence signal (not shown) through a coupling jack 22. The external source of audio frequency sound signals constitutes, in accordance with the specific embodiment described, the conventional crystal pickup of a phonograph or record player which may be included in the television cabinet. Alternatively, within the scope of the present invention, the external audio frequency sound signal source may comprise a microphone, a tape recorder output, or any of various other conventional sources of low level audio intelligence signal. When the movable arm of switch 70 is positioned to contact terminal 70*a*, video signals from tuner 10 are detected at unit 16, translated through amplifier 24 and applied and displayed at cathode ray tube 26. Simultaneously, the picture complementing sound signal which is frequency modulated on the intercarrier wave is applied from the output of amplifier 24 to frequency modulation detector 18 and is demodulated and translated in conventional manner for reprodutcion of picture complementing sound at loudspeaker 30**.

Switch 70 is mechanically connected to be commonly operable with a second switch 72, a third switch 74 and a fourth switch 76 which are respectively arranged to be positioned as shown in the drawing when switch 70 is positioned to contact terminal **70*a*. Switch 72 has its common terminal or movable arm connected directly to the positive terminal B+ of the power supply source 34. First position terminal 72*a* of switch 72 is connected directly to the energizing potential input circuits of the deflection unit indicated in block 32, the tuner 10, and the frequency modulation detector 18. Thus when switch 72 is positioned as shown in the drawing energizing potential is applied therethrough to enable conventional operation of the tuner 10, the detector 18 and the deflection circuits 32. When switch 72 is in its second position as indicated by unconnected terminal 72*b***, the tuner, detector, and deflection circuit are effectively disabled.

Switch member 76 has its movable arm connected through coupling capacitor 66 and volume control potentiometer 68 to the grid electrode of the audio output tube 20. Contact **76*b* of switch 76 is connected directly to the upper end of the wide band amplifier output load impedance as constituted by resistors 52, 50 and inductor 48. Contact 76*b* is further connected through inductor 44 and tuned circuit 40 to the anode electrode of wide band amplifier tube 24. When switch 76 is in the position shown it provides an open circuit between the load impedance 46, 50, 52 and the audio output tube 20, thus prohibiting transmission of video signals from tube 24 into the audio signal channel 20, 28, and 30. When switch 76 is closed so that the movable arm contacts terminal 76*b*, audio frequency sound signals derived from input jack 22 and amplified by tube 24 are transmitted through inductor 44 and switch 76 to the input circuit of audio amplifier 20 thus enabling signals from the external audio source to be reproduced at loudspeaker 30**.

The final audio amplifier stage 20 is normally a high power output tube capable of providing approximately 0.5 to 2.0 watts of audio power at speaker 30. Such power tubes normally require considerably more input power or grid drive than can be obtained from conventional audio signal sources such as the crystal pickup devices of phonographs and microphones. If the signal from a crystal pickup were applied directly to the power tube 20 the signal source would be overloaded and the amplifier 20 would be incapable of properly amplifying and reproducing the sound through loadspeaker 30. The circuit arrangement of the present invention provides pre-amplification of the sound signals applied to input jack 22 so that the input to amplifier tube 20 is a signal of appropriate power and voltage levels. Further, the wide band amplifier 24 as utilized in accordance with the present invention has an extremely wide band pass characteristic as compared to conventional audio pre-amplifier circuits. Thus amplifier 24 translates the signal from input jack 22 to output amplifier 20 without impairing the fidelity of sound signal reproduction.

To provide the necessary video bandwidth, wide band amplifier 24 is provided with a degenerative feedback circuit 80 comprising resistor 82 connected to the cathode of tube 24 and capacitor 84 connected in shunt therewith. Capacitor 84 is chosen to have a high impedance (compared to the resistance 82) at frequencies in the range below about 2 or 3 megacycles. In the frequency range between 3 megacycles and 4.5 megacycles the impedance of capacitor 84 becomes sufficiently low to partially bypass the resistor 82. Thus the degenerative feedback circuit 80 serves to degenerate low frequency components of the video signal applied to tube 24 while the high frequency components of the video signal are translated at substantially higher gain. Accordingly, in the normal operation of amplifier 24 as a video amplifier of the television signal, feedback circuit 80 together with high frequency peaking inductors 44 and 48 provides a flat frequency response characteristic from zero to approximately 4.5 megacycles. In other words, the effect of feedback circuit 80 is to trade gain for band width by reducing the gain of amplifier 24 at low frequencies so that the amplification of all video signal components from zero to approximately 4 megacycles is substantially the same.

When the system of the present invention is to be utilized for amplification of audio frequency sound signals, it is desirable to provide the greatest possible amplification of the sound signal by amplifier 24. At the same time it is unnecessary to maintain the zero to 4 megacycle band pass characteristic because the sound signals applied to input jack 22 practically never contain audio information at frequencies above 20 kilocycles per second. Accordingly, when the amplifier 24 is being utilized as a pre-amplifier of audio frequency signals applied to jack 22, it is advantageous to increase the gain of amplifier 24 by sacrificing bandwidth. The foregoing desideratum is accomplished in the present invention by means of a bypass capacitor 86 connected in series with a switch 74 across the terminals of feedback circuit 80. When switch 74 is open as shown in the drawing, capacitor 86 is disconnected from the cathode of tube 24 and the degenerative feedback circuit 80 operates in its normal manner as previously described. When switch 74 is operated to its closed position the movable arm thereof contacts terminal 74*b* and completes a shunt circuit through capacitor 86 from the cathode of tube 24 to ground. Thus, when switch 70 is moved to its second position so as to receive signals from the phonograph pickup device, switch 74 is simultaneously operated to its closed position to connect bypass capacitor 86 across the feedback circuit 80. Capacitor 86 is preferably chosen to have a relatively low impedance to audio signals so that no substantial degeneration of the audio signals from jack 22 occurs. By connection of capacitor 86 the degenerative effect of network 80 is eliminated so that amplifier tube 24 produces maximum amplification of the audio signals translated therethrough to the output amplifier 20.

In the practice of the present invention for pre-amplification of audio frequency sound signals, the FM detector and the deflection circuits 32 are disabled by the opening of switch 72. This prevents any possible interference from television signals during the reception of phonograph audio signals. Furthermore, disabling the deflection circuit 32 prevents interference which might otherwise result from the 15 kilocycle scanning signals normally generated by the horizontal deflection circuit.

In some television receivers of the general type described heretofore it is desirable to provide B+ potential to the frequency modulation detector from the so called "boosted B+" output of the horizontal deflection circuit. It will be understood by those skilled in the art that in such arrangements the switch 72 may be arranged to disconnect the B+ from the tuner 10 and the deflection circuits 32 only. Deenergization of the deflection circuits will directly effect deenergization of the boosted B voltage applied therefrom to the frequency modulation detector. It is to understood that the present invention in no way is limted to the particular circuit shown but may include such alternative arrangements as that just described without departing from the scope of the invention.

It is to be further understood that, although the particular switching arrangement shown in the drawing has been found to provide the desired alternative operation of the receiver circuits, other switching arrangements may be successfully utilized and the present invention is not limited to the particular embodiment disclosed but is susceptible of various changes and modifications without departing from the spirit and scope thereof.

I claim as my invention:

1. A television receiver comprising a first signal source of demodulated television signals; a second signal source of audio frequency sound intelligence signals; a wide band amplifier having input and output terminals; first switch means for selectively applying said television signals and said audio signals to said input terminals; a picture reproducer; sound reproducing means; and second switch means to selectively apply signals from the output terminals of said wide band amplifier to said picture reproducer and said sound reproducing means.

2. A combination television receiver and audio amplifier comprising a first signal source of demodulated television signals including picture intelligence components and a frequency modulated sound intercarrier component; a second signal source of audio frequency signals having amplitude variations corresponding to sound intelligence; a wide band amplifier comprising a discharge device having at least a cathode, a control electrode and an output circuit; first switch means for selectively connecting said control electrode to said first and second signal sources; a cathode ray tube; a frequency modulation detector having input and output circuits; an audio amplifier and a sound reproducer coupled in cascade to the output circuit of said frequency modulation detector; circuit means connected to said discharge device output circuit for separately applying said sound intercarrier component and said picture intelligence components respectively to said frequency modulation detector and to said cathode ray tube; second switch means commonly operable with said first switch means for selectively connecting the input circuit of said audio amplifier to the output circuit of said discharge device when said first switch means is conditioned to apply said second signal to the control electrode.

3. A combination television receiver and audio amplifier comprising a first signal source of demodulated television signals including picture intelligence components and a frequency modulated sound intercarrier component; a second signal source of audio frequency signals having amplitude variations corresponding to sound intelligence; a wide band amplifier comprising a discharge device having at least a cathode, a control electrode and an output circuit; first switch means for selectively connecting said control electrode to said first and second signal sources; a cathode ray tube; a frequency modulation detector having input and output circuits; an audio amplifier and a sound reproducer coupled in cascade to the output circuit of said frequency modulation detector; circuit means connected to said discharge device output circuit for separately applying said sound intercarrier component and said picture intelligence components respectively to said frequency modulation detector and to said cathode ray tube; second switch means commonly operable with said first switch means for selectively connecting the input circuit of said audio amplifier to the output circuit of said discharge device when said first switch means is conditioned to apply said second signal to the control electrode and third switch means commonly operable with said first and second switch means for disabling said cathode ray tube when said first switch means is conditioned to apply said second signal to the control electrode of said discharge device..

4. A combination television receiver and audio amplifier comprising a first signal source of demodulated television signals including picture intelligence components and a frequency modulated sound intercarrier component; a second signal source of audio frequency signals having amplitude variations corresponding to sound intelligence; a wide band amplifier comprising a discharge device having at least a cathode, a control electrode and an output circuit; first switch means for selectively connecting said control electrode to said first and second signal sources; a cathode ray tube; a frequency modulation detector having input and output circuits; and audio amplifier and a sound reproducer coupled in cascade to the output circuit of said frequency modulation detector; circuit means connected to said discharge device output circuit for separately applying said sound intercarrier component and said picture intelligence components respectively to said frequency modulation detector and to said cathode ray tube; second switch means commonly operable with said first switch means for selectively connecting the input circuit of said audio amplifier to the output circuit of said discharge device when said first switch means is conditioned to apply said second signal to the control electrode, a video frequency peaking impedance connected between the cathode of said discharge device and a point of reference potential for providing degenerative feedback of signals below a predetermined frequency whereby the bandwidth characteristic presented to said picture intelligence components is enhanced; and third switch means for selectively connecting a bypass capacitor across said peaking impedance for increasing the gain and decreasing the bandwidth of said discharge device when said first switch means is conditioned to apply said second signal to the control electrode.

5. A combination high fidelity audio amplifier and television receiver comprising: a first signal source including a turner, a mixer, an IF amplifier and a second detector for providing demodulated television signals including video intelligence components and beat frequency intercarrier signals frequency modulated with audio intelligence; a second signal source of audio frequency sound signals; a wide band audio-video frequency amplifier having input and output terminals; first switch means having first and second positions for respectively connecting said amplifier input terminals alternatively to said first and second signal sources; an F.M. detector, an audio amplifier, and a sound reproducer coupled in cascade to the output terminals of said wide band amplifier for reproducing sound intelligence corresponding to the modulation of said intercarrier signal when said first switch means is in said first position; video signal utilization means coupled to said output terminals for reproducing pictures corresponding to said video intelligence components; second switch means for selectively connecting the output terminals of said wide band amplifier to the input circuit of said audio amplifier; and third switch means, commonly operable with said first and second switch means, and connected to disable said tuner, said FM detector, and said video signal utilization means when said first switch means is in said second position whereby said wide band amplifier and said audio amplifier are conditioned to apply sound signals from said second source to said sound reproducer without interference from said television signals.

6. A television receiver comprising a first signal source of demodulated television signals; a second signal source of audio frequency sound intelligence signals; a wide band amplifier having input and output terminals; first switch means for selectively applying said television signals and said audio signals to said input terminals; a picture reproducer; sound reproducing means; and second switch means to selectively apply signals from the output terminals of said wide band amplifier to said picture reproducer and said sound reproducing means, feedback means connected to said wide band amplifier for providing degenerative feedback of signals below a predetermined frequency to improve the bandwidth characteristic presented by said amplifier to said television signals; and third switch means commonly operable with said first switch means for disabling said feedback means to thereby increase the gain of said amplifier when said first switch means is conditioned to apply said audio signals to the amplifier.

References Cited in the file of this patent

UNITED STATES PATENTS

| | | |
|---|---|---|
| 2,097,874 | Farnham | Nov. 2, 1937 |
| 2,609,441 | Keizer | Sept. 2, 1952 |